(12) United States Patent
de Koning

(10) Patent No.: US 8,271,188 B2
(45) Date of Patent: Sep. 18, 2012

(54) SYSTEMS AND METHODS FOR DETERMINING LOCATION USING CELLULAR TRANSITION PATTERNS

(75) Inventor: Wilhelmus de Koning, Wassenaar (NL)

(73) Assignee: Octaview Technologies B.V., Wassenaar (NL)

( * ) Notice: Subject to any disclaimer, the term of this patent is extended or adjusted under 35 U.S.C. 154(b) by 995 days.

(21) Appl. No.: 12/163,494

(22) Filed: Jun. 27, 2008

(65) Prior Publication Data

US 2009/0005972 A1    Jan. 1, 2009

Related U.S. Application Data

(60) Provisional application No. 60/947,154, filed on Jun. 29, 2007.

(51) Int. Cl.
*G01C 21/00*    (2006.01)
(52) U.S. Cl. ..................... 701/409; 455/456.1
(58) Field of Classification Search .................. 701/200, 701/207–209, 201, 300, 400, 408–409, 430, 701/445–448; 340/988–991; 455/456.1, 455/456.3, 456.6
See application file for complete search history.

(56) References Cited

U.S. PATENT DOCUMENTS

| | | |
|---|---|---|
| 5,794,174 A | 8/1998 | Janky et al. |
| 6,169,515 B1 | 1/2001 | Mannings et al. |
| 6,199,010 B1 | 3/2001 | Richton |
| 6,236,861 B1 | 5/2001 | Naor et al. |
| 6,278,939 B1 | 8/2001 | Robare et al. |
| 6,327,533 B1 | 12/2001 | Chou |
| 6,505,117 B1 | 1/2003 | Ratert et al. |
| 6,526,349 B2 | 2/2003 | Bullock et al. |
| 6,581,000 B2 | 6/2003 | Hills et al. |
| 6,823,257 B2 | 11/2004 | Clapper |
| 6,826,474 B2 | 11/2004 | Miyahara et al. |
| 6,917,878 B2 | 7/2005 | Pechatnikov et al. |
| 6,925,378 B2 | 8/2005 | Tzamaloukas |
| 7,103,370 B1 | 9/2006 | Creemer |
| 7,162,363 B2 | 1/2007 | Chinitz |
| 7,162,365 B2 | 1/2007 | Clapper |
| 7,236,091 B2 * | 6/2007 | Kiang et al. ............... 340/539.1 |
| 7,280,803 B2 | 10/2007 | Nelson |
| 7,321,305 B2 | 1/2008 | Gollu |
| 7,324,897 B2 | 1/2008 | Schmitz |
| 2001/0018344 A1 | 8/2001 | Tervo et al. |
| 2002/0173905 A1 | 11/2002 | Jin et al. |
| 2002/0193941 A1 | 12/2002 | Jaeckle et al. |
| 2003/0008668 A1 | 1/2003 | Perez-Breva et al. |
| 2003/0102974 A1 * | 6/2003 | Allen .......................... 340/686.6 |
| 2003/0152047 A1 | 8/2003 | Alger |

(Continued)

FOREIGN PATENT DOCUMENTS

EP    0 332 434    9/1989

(Continued)

OTHER PUBLICATIONS

International Search Report and Written Opinion for PCT/IB2008/002117, mailed Dec. 17, 2008.

(Continued)

*Primary Examiner* — Dalena Tran
(74) *Attorney, Agent, or Firm* — Goodwin Procter LLP

(57) ABSTRACT

Location may be determined based on a map that includes a plurality of transition patterns for a geographic feature. Each such transition pattern is different from the others.

23 Claims, 7 Drawing Sheets

U.S. PATENT DOCUMENTS

| | | |
|---|---|---|
| 2005/0246092 A1 | 11/2005 | Moscatiello |
| 2005/0246094 A1 | 11/2005 | Moscatiello |

FOREIGN PATENT DOCUMENTS

| | | |
|---|---|---|
| EP | 1 122 702 A | 8/2001 |
| EP | 1 435 600 | 7/2004 |
| EP | 1 473 959 | 11/2004 |
| WO | WO-96-35306 | 11/1996 |
| WO | WO-02-01158 | 1/2002 |
| WO | WO-02-15148 | 2/2002 |
| WO | WO-2005-092052 | 10/2005 |
| WO | WO-2007-133970 | 11/2007 |

OTHER PUBLICATIONS

Liu et al., "Mobility Modeling, Location Tracking, and Trajectory Prediction in Wireless ATM Networks," *IEEE Jrl. on Selected Areas in Communications*, IEEE Service Center, Piscataway, US, vol. 16, No. 6 (Aug. 1, 1998).

* cited by examiner

| | CTP #1 |
| --- | --- |
| | CTP #2 |
| GEOGRAPHIC FEATURE #1 | ⋮ |
| | CTP #n |
| | CTP #1 |
| | CTP #2 |
| GEOGRAPHIC FEATURE #2 | ⋮ |
| | CTP #n |
| | CTP #1 |
| | CTP #2 |
| ⋮ | ⋮ |
| | CTP #n |
| | CTP #1 |
| | CTP #2 |
| GEOGRAPHIC FEATURE #m | ⋮ |
| | CTP #n |

FIG. 1A

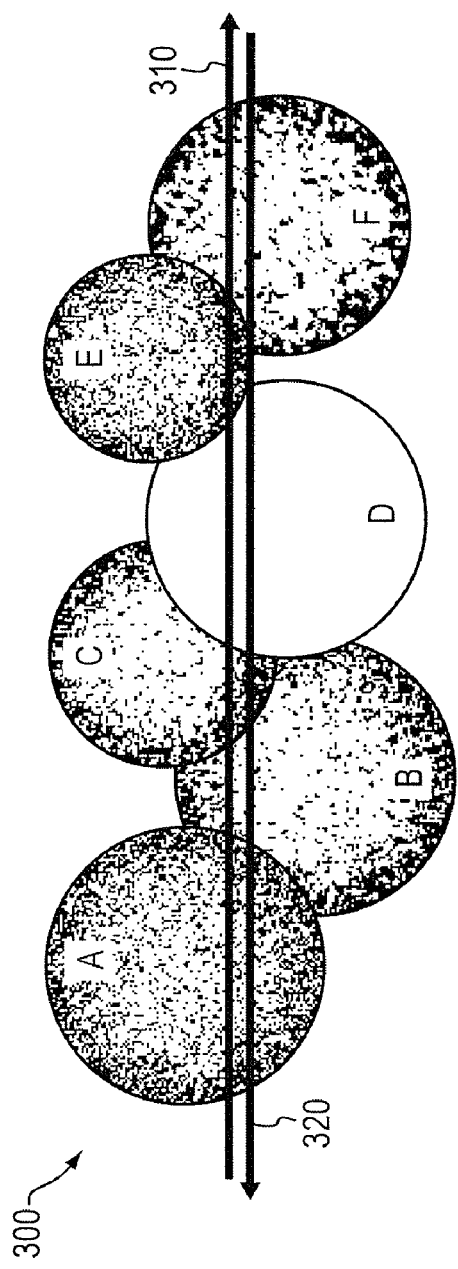
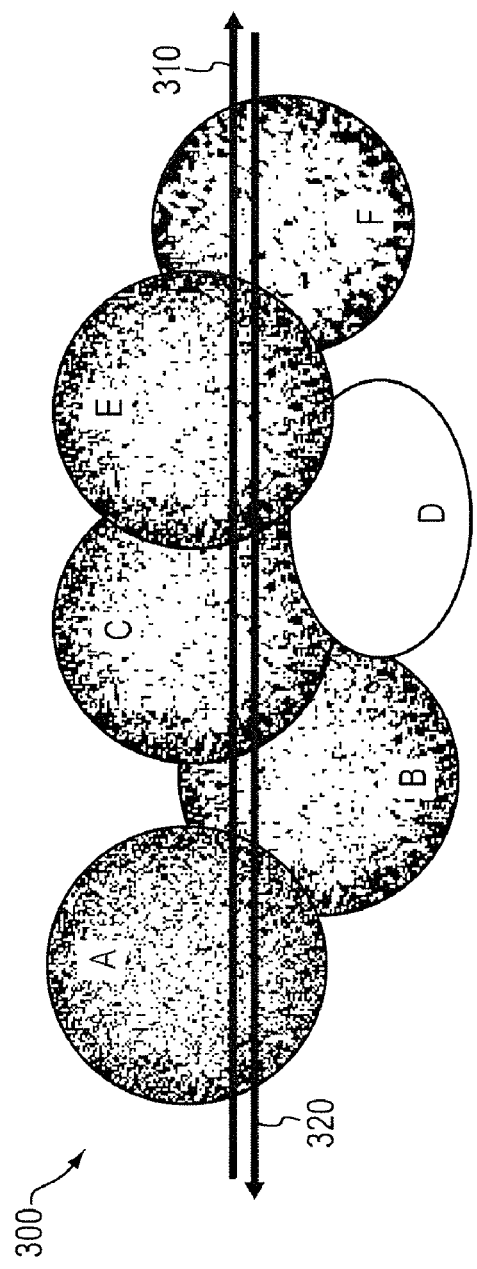
FIG. 3A
FIG. 3B

SYSTEMS AND METHODS FOR DETERMINING LOCATION USING CELLULAR TRANSITION PATTERNS

CROSS-REFERENCE TO RELATED APPLICATION

This application claims priority to and the benefit of, and incorporates herein by reference in its entirety, U.S. Provisional Patent Application No. 60/947,154, which was filed on Jun. 29, 2007.

TECHNICAL FIELD

In various embodiments, the present invention relates to location awareness, and in particular to radio signal-based location determination.

BACKGROUND

Location awareness is typically an important aspect of mobile computing. Location awareness of nodes in a mobile communications network may also improve the overall utilization of that network. This is true both for mobile cellular networks as well as for mobile ad hoc topologies. Location awareness may also be used to enhance Travel Information Systems, which may lead to better utilization of the road network.

Traditional location techniques, like the Global Positioning System ("GPS"), typically deliver very accurate location information, but considerations of cost, size, form factor and power requirements currently make mass deployment too costly and impractical. Moreover, reliable GPS signals may be unavailable in many areas due to lack of line-of-sight with a required number of geosynchronous GPS satellites in, e.g., indoor locations, tunnels, subway passages, locations surrounded by tall buildings such as skyscrapers, or other areas where interference disrupts the signal. Further, as more systems become dependent on GPS (e.g., road toll systems) an alternate robust backup and/or referencing system would be advantageous. Uptake on telecom network-based location-determination techniques has also been quite low. Operators cite the high deployment and operational cost as the main inhibitors.

Cellular networks, like the Global System for Mobile Communications (GSM), are designed in such a way that each transmitter, i.e., base station, covers a specific geographic area (the "cell"). Typically, the cell radius may vary between approximately 0.1 and approximately 7.5 kilometers (km). The base station of each cell typically transmits a three part identifier, which includes a country code, a network or operator code, and a cell number (its "cell-id"). The combination of these three items provides a worldwide unique identifier for a cell. Other networks (e.g., various cellular or wireless networks) may utilize different identifier(s) for each uniquely identifiable cell that are also applicable to embodiments of the present invention. For example, a Wi-Fi or wireless local area network (WLAN) may utilize unique hardware-based identifiers typically termed Media Access Control (MAC) addresses.

A GSM device, e.g., a cellular phone, connected to the network will continuously monitor what it perceives to be the cell site with the strongest signal. Typically, this will be the signal from the nearest tower, but due to signal scatter or other interference this may also be one that is further away. Signal scatter may be related to variables like weather and traffic intensity, and is therefore not constant over time. Thus, the measured signal may also vary over time. The network device also typically monitors the relative signal strength it receives ("SSID"). There is a theoretical relation between the SSID and distance to the base station, but in practice this relation is not reliable enough to form the basis for a robust and accurate location determination system.

SUMMARY

The foregoing limitations of conventional location determination schemes are herein addressed by utilizing a combination of patterns generated from characteristics of a network (e.g., cell-id) and knowledge of the layout of the underlying geographical infrastructure (e.g., a road network) to determine a reliable location of a node (e.g., a device) within that network, as well as its direction of travel.

In accordance with embodiments of the invention, a user, or node, of a cellular or other radio network is located by comparing the user's, or node's, measured cellular transitions (i.e., the pattern generated by the registration of movement of the user or node from one uniquely identified cell to another) with a map that contains measured distinct characteristics of a cellular radio signal, e.g., cell-id patterns, and a model of road networks (or other physical and/or geographic features). Because this method is a passive technique and uses information already available in the network (e.g., the cell-ids), it may be used as a foundation for a cost-effective and scalable location service for cellular and other radio networks. Since, in practice, the location, extent, and strength of any particular cell signal may vary widely over time, embodiments of the invention do not rely on the geographic locations of radio network signaling towers or other infrastructure to infer the location of a node present in a particular cell. Rather, a robust map which includes multiple different cellular transition patterns corresponding to a given geographic area or feature may be utilized as a look-up table. A measured cellular transition pattern ("CTP") may be cross-referenced to the map. In an embodiment, no exact match (or multiple possible matches) with the measured CTP exists, and an algorithm is utilized to determine the best match, thus providing the node's approximate location and/or direction of travel.

In one aspect, embodiments of the invention feature a system that includes a map of transition patterns and a device capable of detecting radio network identification codes for generating a measured transition pattern. The map may include a plurality of transition patterns for a geographic feature, each transition pattern being different from the other transition patterns. The system may include means for generating an approximately physical location based on the measured transition pattern and the map. The geographic feature may include or consist essentially of a road. In an embodiment, the map is stored on the device, which may be a phone, e.g., a cellular phone. The device may include or consist essentially of a computing device and/or processor capable of radio communication. In another embodiment, the system includes a server that stores the map, and the device is capable of communicating with the server.

In another aspect, embodiments of the invention feature a method for determining location. The method includes providing a map that includes a plurality of transition patterns for a geographical feature, each transition pattern being different from the other transition patterns. The method may further include detecting a transition pattern for a device and querying the map with the detected transition pattern to determine the location of the device.

Embodiments of the invention may include the following features. The location may be outputted on the device. The device may include the map, or a map server may store the map and communicate with the device. Querying the map may include matching at least a portion of the detected transition pattern with at least a portion of one of the transition patterns in the map, and/or may result in determining the device's direction of travel. The location and direction of travel may be sent to a server, which may store the information chronologically in a database. Travel (e.g., traffic) and/or toll information may be received from the server. The location of the device may be sent to a navigation system, such as a GPS-enabled system. The device may also communicate with a second device capable of detecting radio network identification codes to generate a transition pattern.

In a further aspect, embodiments of the invention feature a method for forming a cellular transition map. The method may include measuring data corresponding to a geographic feature, the data including or consisting essentially of a plurality of cellular transitions and geographic location information. The data may be stored in a database, and the measurement and storage steps may be repeated. The cellular transitions and geographic location information may be measured separately and cross-referenced as a function of time. Signal-strength data may also be measured and stored in the database.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 1A is an exemplary CTP map formed in accordance with various embodiments of the invention;

FIGS. 1B, 2, 3A, and 3B are schematic diagrams of exemplary transition patterns generated from the overlap of radio communications signal coverage areas and geographic features in accordance with various embodiments of the invention;

DETAILED DESCRIPTION

Figure 1B:
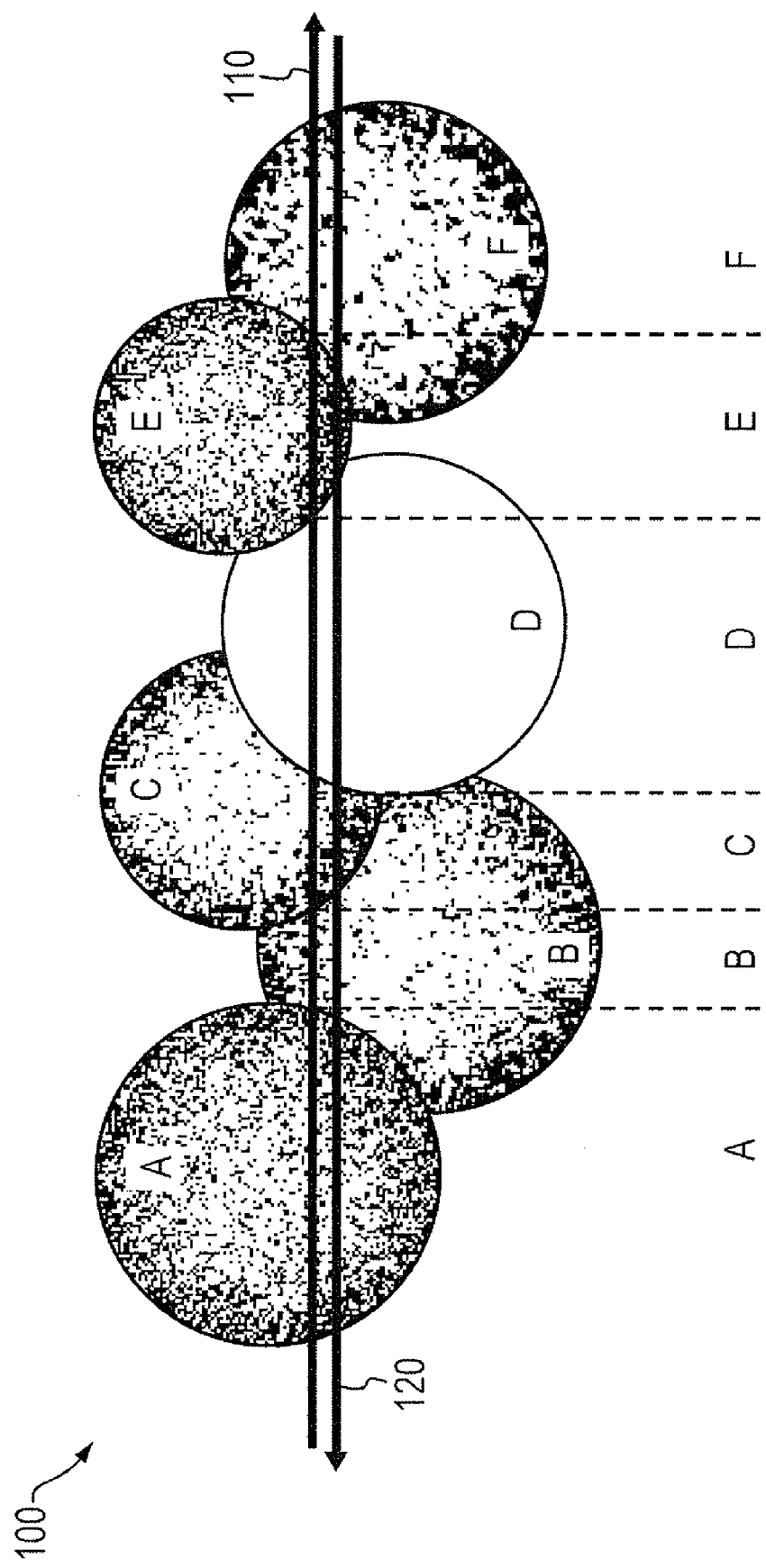

In accordance with one embodiment of the invention, a CTP of a moving device is compared to a map of transition patterns (a "CTP map") in order to determine the location and direction of travel of the device. While each transition pattern is herein referred to as a cellular transition pattern, embodiments of the invention are applicable not only to cellular communications networks but also to any radio signal communications network with uniquely identifiable transmitters and/or coverage areas (i.e., cells), e.g., a WLAN (such as a network utilizing Wi-Fi), an ad-hoc network, a Bluetooth network, a video broadcasting network such as Digital Video Broadcasting for Handhelds (DVB-H), or a radio-frequency identification (RFID) network.

The CTP map may be created by registering the transitions between cells in a cellular or other radio signal network. Each cell may have, or may be assigned, a unique id, e.g., a cell-id. In one embodiment, while moving along a known geographic feature (e.g., a road or railroad), a device registers the transitions between the cells as a sequence of cell-ids. The device may also store a number of other data, such as the type of device registering the cell transitions, current geographic location, direction, time, and/or travel speed. The sequence of cell-ids and other data recorded and stored by the device may then be used in creating the map. In one embodiment, the CTP map includes multiple CTPs corresponding to the particular geographic feature (e.g., the road segment) and the travel direction on that feature, where each such CTP differs from the others. Different CTPs corresponding to the same geographic feature may be measured, e.g., on different days of the week and/or at different times of the day, and thus may vary due to differences in weather, traffic patterns, and/or other factors. Certain CTPs may also be device-specific. The CTP map may be made available on-line or stored in the device. FIG. 1A depicts an exemplary CTP map which includes or consists essentially of a look-up table containing multiple CTPs corresponding to each geographic feature.

To retrieve its location and travel direction, a device measures one or more transitions between cells and uses the measured pattern to query the CTP map. A comparison between the measured pattern and the CTP map may thus provide a direct correlation between the pattern and the physical location of the cellular device. For example, a specific pattern of cellular network cells may correspond to a particular location on a highway or other road. In accordance with embodiments of the invention, correlation of a measured transition pattern with one or more transition patterns in a CTP map may provide approximate physical location information in locations where other location determination services, e.g., GPS, are not available. For example, GPS signals may be unavailable due to lack of line of sight with a required number of geosynchronous GPS satellites in, e.g., indoor locations, tunnels, subway passages, locations surrounded by tall buildings such as skyscrapers, or other areas where interference disrupts the signal.

Embodiments of this invention have the following advantages. The accuracy of the technique is not impacted by cellular signal variations caused by, e.g., weather conditions or cellular traffic intensity, as the technique does not rely on signal strength of cell(s) measured at a certain point. Moreover, even if the signal from one or more cells drops significantly (or even completely), partial patterns generated from remaining cell signals may be matched with a high degree of accuracy and repeatability. The implementation costs may be low because embodiments of the invention do not require any investment in new network location equipment, antennae, or network capacity. Implementation of embodiments of the invention require no knowledge of the actual location of cell towers or other network infrastructure, information that is typically not readily available to third parties. Therefore, the system may be implemented by anyone and requires no cooperation or permission from the operator of the cellular network. Embodiments of the invention do not generate additional traffic, either between the device and the tower, or on the network, and may therefore be scalable to millions of users with little or no impact on network traffic or performance. Embodiments of the invention may be implemented on any cellular network and need not (beyond the availability of a signal) be dependent on any network service component. CTP maps may seamlessly span multiple networks/operators in multiple countries, rather than only within a network of a single operator. User privacy may be enhanced because embodiments of the invention need not store the current location in the network. Rather, the CTP map may be implemented in a cellular phone or other personal cellular-based device, so that only the user is aware of the established location. The timing between transitions may be used to estimate the speed of travel, which may be utilized to detect road traffic conditions. Embodiments of the invention may be utilized to establish the proximity of two or more devices on the network. For example, multiple devices reading the same pattern in approximately the same time interval may be traveling the same route in the same vehicle or in vehicles in close proximity. This may be used to detect, by inference, the location of transport vehicles, such as trains or buses, on which users may be traveling.

FIG. 1B depicts an overview of one embodiment of the invention. A geographic feature 100 includes paths 110, 120 traversing radio communications coverage areas A-F in approximately opposite directions. Geographic feature 100 may include or consist essentially of, e.g., a highway or other road, a railway, a river, and/or other identifiable feature. Radio communications coverage areas A-F may correspond to, e.g., cells in a cellular or WLAN communications system. Progression along one of paths 110, 120 creates a transition pattern, e.g., a CTP, as one radio communication coverage area is exited and another is entered. For example, a CTP corresponding to travel along path 110 is A-B-C-D-E-F, and a CTP corresponding to travel along path 120 is F-E-D-C-B-A. Geographic feature 100 and its corresponding transition patterns form the basis for a CTP map which may be utilized to determine position and/or direction of travel in accordance with various embodiments of the invention. In an embodiment, if a cellular phone or other device (e.g., the phone of a person driving a car) is moving along geographic feature 100, it may detect the transition pattern as it traverses radio communications coverage areas A-F and cross-reference the resulting transition pattern to the CTP map. For example, the transition pattern C-D may be identified as a particular section of path 110, while pattern D-C may be identified as a particular section of path 120. Thus, both location as well as direction of movement may be determined.

Figure 2:
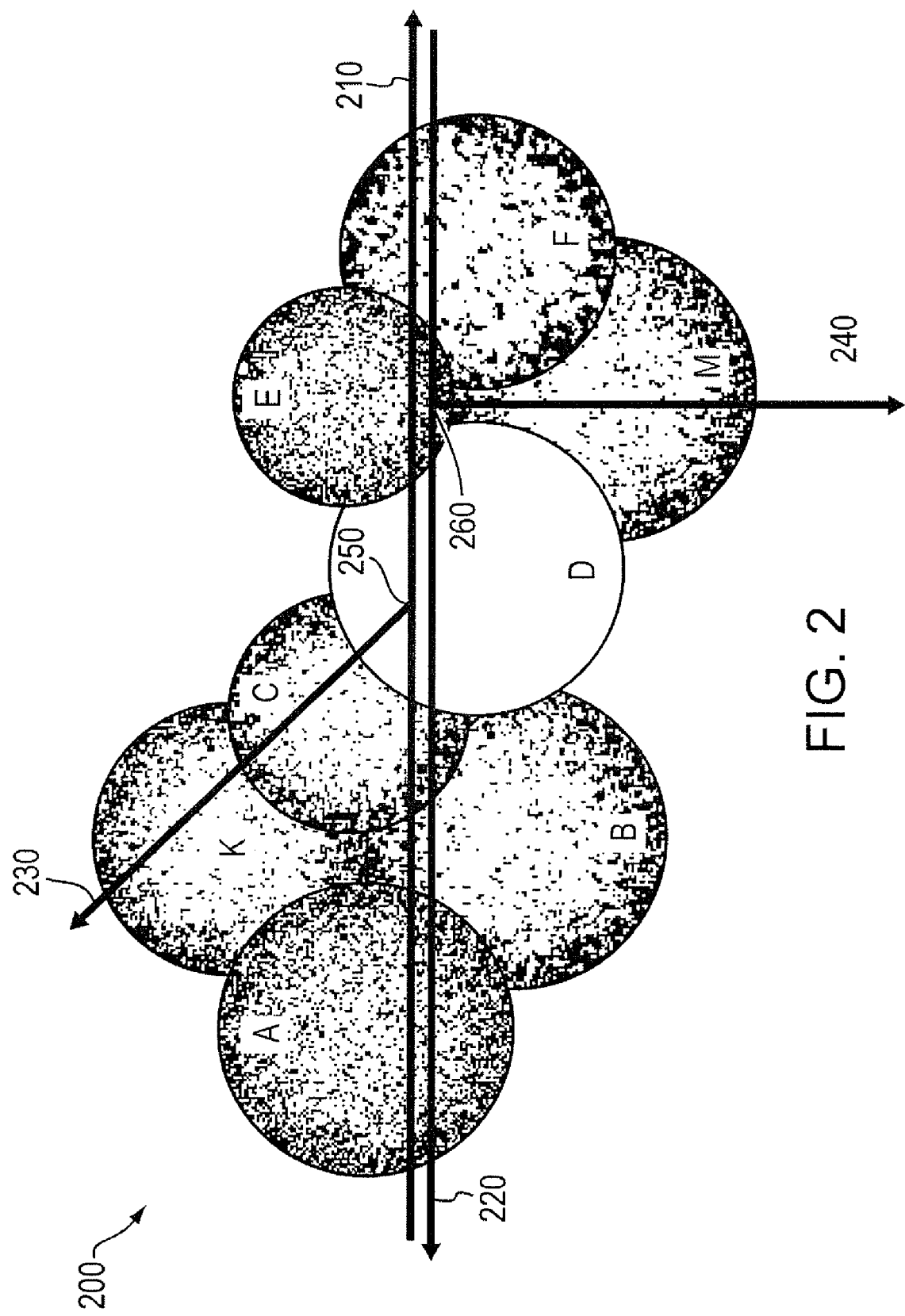

FIG. 2 depicts a geographic feature 200 that includes paths 210, 220, 230, 240 traversing radio communications coverage areas A-F in different directions. Intersections 250, 260 represent connections between paths 210 and 230 and paths 220 and 240, respectively. In an embodiment, a transition pattern for a traversal of path 220 to path 240 (via intersection 260) includes F-E-M, whereas a transition pattern for travel along path 220 (bypassing path 240) includes F-E-D. In various embodiments, a single transition between two of radio communications coverage areas A-F applies to possible travel along more than one path. For example, a transition pattern including D-C may correspond to a portion of path 220 as well as to a portion of path 230. In such an embodiment, a transition pattern larger than two, e.g., three, four, or even larger, may be required to identify the position and/or direction of travel of a user or device monitoring the transition pattern. In this example, transition pattern D-C-B may indicate continued travel along path 220, and transition pattern D-C-K may indicate continued travel along path 230. In an embodiment where radio communications coverage areas A-F correspond to cellular communications cells, such cells may have approximate diameters of 100-250 meters. Thus, for a rate of travel of approximately 100 km/hour, single transitions may occur approximately 3-9 seconds apart, enabling fast determination of position and/or direction of travel.

The patterns need not be an exact match for this robust technique to provide location and/or direction information. Due to variations in the radio signal, measured patterns may vary. For instance, there might be omissions or insertions of certain individual transitions. A matching algorithm may compensate for these missing or extra transitions in the transition pattern based on probabilities of patterns and/or deduction from previous matched patterns. Moreover, in a preferred embodiment, the CTP map includes multiple CTPs (e.g., each different from the others and corresponding to measured transition patterns during different measurement conditions, such as time of day, day of the week, weather conditions, time of the year, specific device characteristics, etc.) for each path in a geographic feature, thereby facilitating a match with a CTP measured during any specific measurement condition. In another embodiment, one or more paths in a geographic feature have only one CTP associated therewith.

FIGS. 3A and 3B depict embodiments where the measured cell coverage changes due to, e.g., traffic intensity, weather, or other factors. In FIG. 3A, radio communications coverage areas A-F cover paths 310, 320 in geographic feature 300, but in FIG. 3B, coverage area D does not cover paths 310, 320. Thus, in the embodiment of FIG. 3A, traveling along path 310 will result in a CTP of C-D-E, while, in the embodiment of FIG. 3B, traveling along path 310 will result in a CTP of C-E. When the CTP map is queried for C-E there may be no initial match to the multiple CTPs stored in the CTP map. However, another attempt may be made in which the CTP map is queried with a wildcard pattern such as C-*-E in order to determine whether matching patterns containing C, at least one other cell, and E, in that order, exist (where * represents the wildcard operator). This query will typically return the correct location, as there will be a match with C-D-E. The use of patterns and/or statistical probabilities to resolve pattern variations against the map may preferably be incorporated into the CTP map and/or query algorithm.

CTPs may be expressed as strings, and one or more characters may be assigned to each cell-id and/or cell-id-SSID combination. Strings may be easily searched or matched with algorithms written in a computer language like Perl, which is well known for its strong string-processing capabilities. Measured CTPs may be matched to those on the CTP map by utilizing string-matching techniques like those used in biological computing to find a match between a piece of DNA and a full DNA string (see, e.g., R. A. Dwyer, *Genomic Perl, From Bioinformatics Basics to Working Code*, Cambridge University Press, Cambridge, UK (2003), the entire disclosure of which is hereby incorporated herein by reference), even when only partial matches and/or gaps in the sequences exist. The use of any of a number of other matching algorithms is also within the scope of this invention. Examples of suitable matching algorithms may be found in Graham A. Stephen, *String Searching Algorithms*, World Scientific, Singapore (1994); G. Navarro and M. Raffinot, *Flexible Pattern Matching in Strings*, Cambridge University Press, Cambridge, UK (2002); R. Durbin et al., *Biological Sequence Analyses: Probabilistic Models of Proteins and Nucleic Acids*, Cambridge University Press, Cambridge, UK (1998); and/or J. Coleman, *Introducing Speech and Language Pro-* cessing, Cambridge University Press, Cambridge, UK (2005); the entire disclosure of each of which is incorporated herein by reference. In accordance with various embodiments of the invention, character-by-character matching of a measured CTP with the CTPs of the CTP map is not required. Rather, matching may identify the map CTP most similar to the measured CTP by selecting the map CTP with the smallest edit distance from the measured CTP. In various embodiments, statistical models such as Hidden Markov Models may be utilized in the matching process.

In some embodiments, a measured CTP may match with a portion of more than one CTP in the map. In such a case, a conditional probability may be assigned to each matching CTP in the map, and the CTP with the highest probability may be selected as the matching CTP. The conditional probability may be Bayesian, i.e., a function of the relative frequencies of the measured CTP on the map CTPs. The conditional probability may also depend on earlier CTPs encountered and recorded by the device, geographical or physical constraints, and/or the rate of travel measured by the speed of transition from one network cell to another. For example, a high rate of speed may increase the probability that the measured CTP corresponds to travel on a highway rather than a secondary street. Moreover, approximately real-time traffic information (obtained by the map server and/or the device from other CTP-matching devices) may also be utilized to calculate conditional probabilities.

Figure 4:
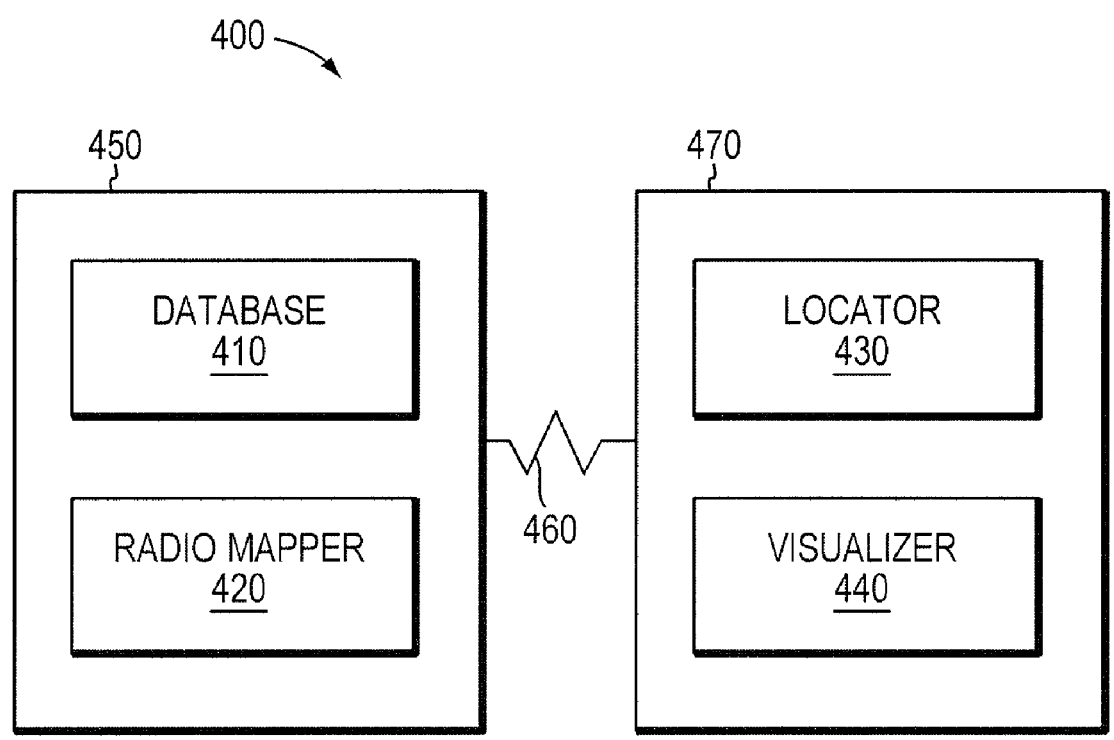
FIG. 4 is a diagram of components in a location determination system in accordance with one embodiment of the invention.

Referring to FIG. 4, in various embodiments of the invention, a location determination system 400 includes or consists essentially of one or more of database 410, radio mapper 420, locator 430, and visualizer 440. Other systems used in accordance with the invention may include additional components or may omit one or more components, depending on the desired functionality. Database 410 and radio mapper 420 may be present on server 450, which is connected via connection 460 to mobile network device 470. Connection 460 may include or consist essentially of a wireless network communication link or any other suitable wired or wireless connection. In an embodiment, database 410 and radio mapper 420 are utilized to create a CTP map, which is stored on server 450 or on one or more mobile network devices 470 (e.g., cellular phones). Moreover, locator 430 and visualizer 440 (depicted in FIG. 4 as present on server 450, but which may alternatively be present on the mobile network device 470) are utilized, in conjunction with the stored CTP map, to determine the location and/or rate of travel of the mobile network device 470.

Database 410 may store network signal measurements with location information, as well as the layout and constraints (e.g., direction, speed limits, and/or exits) of the geographical model of desired terrain (e.g., one or more roads). Radio mapper 420 may create the CTP map—the correlation between CTPs and the road network. Locator 430 may compare a measured CTP with the CTPs stored in the CTP map (i.e., it queries the CTP map), thereby translating the measured CTP into a physical location and/or rate of travel. Visualizer 440 may plot the physical location on a geographical map or create specific projections of the data, as desired.

Database 410, e.g., an SQL database, may store data in one or more of the following fields (collectively, the "signal log") for each signal measurement utilized to form the CTP map: trip identification number, which signifies a particular trip along a portion of the map; cell-id; SSID; device characteristics (e.g., brand and model, current battery power); date and time of the measurement; physical location, e.g., GPS coordinates; and any recordable geographic features, e.g., designations for roads or segments thereof. Database 410 may also store a representation of a geographical area, e.g., a road network. In an embodiment, each of a plurality of segments of a road network may be stored as a directed graph. For each segment, one or more of the following may be stored: designation(s) for the road and/or road segment such as highway numbers or mile markers; coordinates and node identifiers for the start and end of the segment; the layout of the segment, e.g., a polyline in map coordinates representing the segment; average speed of vehicles travelling on the segment; the speed limit of the segment; the type of road, e.g., highway, secondary road, or residential road; and the number of parallel lanes of traffic in the segment.

Radio mapper 420 may create the CTP map with data stored in database 410, e.g., the signal log and the road network. Due to variations in the signals in the network due to, e.g., inclement weather and/or other signal scatter, a single road segment may correspond to multiple different CTPs. In an embodiment, each of these CTPs is stored in a matrix, as well as the relative probability of each node-to-node transition in the relevant segment. As described above, these relative probabilities may be utilized when matching a measured CTP to those stored on the CTP map. In an embodiment, the CTPs to be stored are translated into strings (i.e., a character is assigned to each unique cell-id), and matching may be performed by converting the measured CTP into a regular expression and/or utilizing the matching procedures described above.

Locator 430 may translate a measured CTP into a physical location utilizing the CTP map. For example, a search routine first queries the CTP map for all possible geographic features (e.g., road segments) that have a pattern matching the measured CTP. In an embodiment, more than one road segment matches the measured CTP. In such a case, the transition frequency of that pattern (i.e., the aggregate number of matches in the multiple CTPs corresponding to each segment) is calculated for each of the matching segments, and the segment with the highest frequency is chosen as the best match. The approximate location within the segment is determined by calculating the position of the last transition in the measured CTP. Because the CTP map may store multiple variances of the patterns for a segment (i.e., variations in the approximate location of individual cell transitions in a CTP), there may be multiple possible physical locations for each individual transition. In such a case, the median value of these possible locations may be selected as the estimated position. Determination of physical location may involve a trade-off between speed and pattern size; larger patterns may facilitate more accurate location determination but take more time to measure. In an embodiment, previous locations and/or physical constraints (e.g., road layout, travel direction, exit possibilities, realistic speed) derived from the map are utilized to narrow down and/or determine an estimated position based on the measured CTP.

Figure 5:
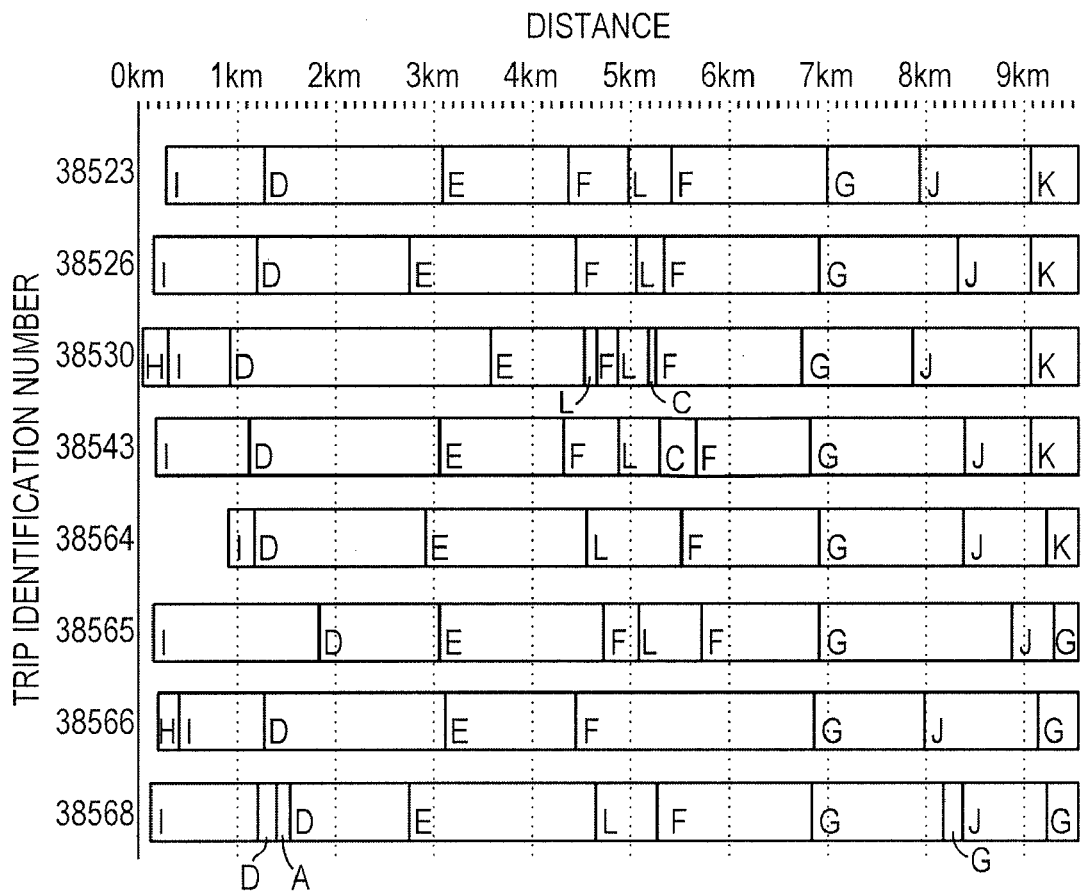
FIG. 5 is a plot of various CTPs corresponding to a particular geographic feature in accordance with an exemplary embodiment of the invention.

Visualizer 440 may output the results from locator 430 in machine- and/or human-readable form. In an embodiment, visualizer 440 outputs Scalable Vector Graphics (SVG) output files, which may be rendered in a web browser, such as the Internet Explorer program available from Microsoft Corporation of Redmond, Wash. Visualizer 440 may output location and/or cell information in the form of a map plot, in which different cell-ids in a CTP (e.g., each cell-id being rendered in a different color) are overlaid on a geographical map that includes geographic features such as roads. The visualizer 440 may also output cell-ids as a function of distance along a particular route (e.g., as bars of various colors or pattern fills) on a cell plot. Multiple trips may be shown on a cell plot along its y-axis. FIG. 5 (described further below) depicts an exemplary cell plot. Bars corresponding to particular cell-ids may be varied in size, e.g., vertically, to represent the SSID of the cell during a particular trip.

In some embodiments, the location determination system 400 (and/or one or more modules 410, 420, 430, 440 thereof) implement the functionality of the present invention in hardware or software, or a combination of both on a general-purpose computer or integrated circuit device, which may be a part of or connected to the network device. In addition, such functionality (e.g., a program) may set aside portions of a computer's random access memory to provide control logic that affects one or more of the image manipulation, segmentation, and display. In such an embodiment, the program may be written in any one of a number of high-level languages, such as FORTRAN, PASCAL, C, C++, C#, Java, Python, Tcl, BASIC, or Perl. Further, the program may be written in a script, macro, or functionality embedded in commercially available software, such as EXCEL or VISUAL BASIC. Additionally, the software may be implemented in an assembly language directed to a microprocessor resident on a computer. For example, the software may be implemented in Intel 80×86 assembly language if it is configured to run on an IBM PC or PC clone. The software may be embedded on an article of manufacture including, but not limited to, "computer-readable program means" such as a solid-state memory device, a floppy disk, a hard disk, an optical disk, a magnetic tape, a PROM, an EPROM, a DVD-ROM, or a CD-ROM.

Map Formation

In various embodiments, CTP maps are created by collecting the information to be stored in database 410, particularly the cell transition and geographic position information, for a desired geographical area along features such as roads. The cell transition and geographic position information may be synchronized based on their respective measurement times in order to correlate particular cell-ids with their physical positions. In an embodiment, the geographic position information is collected using a GPS receiver, and information such as cell-id and/or SSID is collected using a mobile device such as a GSM mobile phone. As described below, the collected data may go through at least one of validation, transformation and normalization before being stored in database 410. In some embodiments, at least one of these steps may be skipped before storage of data. In geographic areas where GPS signal is not available (e.g., areas lacking line of site to a required number of GPS satellites, such as indoor areas or tunnels), the geographic position information may be interpolated from surrounding measured values, or manually entered following a visual observation of the area. Geographic position information may also be derived from known geographic positions and typical travel times between those positions (e.g., stations in a subway system). In an embodiment, users of the location determination system that have devices that are able to detect both geographic position information and cell-id (e.g., GPS-enabled cellular phones) contribute data to the CTP map. The devices of such users may measure and record CTPs as a function of geographic location and upload the data to a central map server containing database 410. Such data uploads may even occur in real time; such data may then be utilized for location determination as described herein. In further embodiments of the invention, CTPs customized for specific devices are stored in the map server, as idiosyncrasies of particular devices (and/or performance thereof) may result in device-specific CTPs being detected thereby.

In an exemplary validation process, the cell-id and geographic position information is checked for completeness and consistency. In some circumstances (e.g., in tunnels or heavy foliage), no geographic data may be recorded. For consistency, all data records without corresponding geographic data may be removed from database 410. In an alternative embodiment, geographic data is calculated or manually determined as described above. In an embodiment, erroneous geographic data is removed from database 410. For example, the average speed traveled between two consecutive readings may be determined by comparing a location and time of the readings. If the average speed is higher than a certain threshold (e.g., 180 km/hr), one or both of the geographic data readings may be removed from database 410.

In an exemplary transformation process, the geographic position information may be transformed into data having different units. In an embodiment, the geographic position information is converted from spherical units (e.g., longitude and latitude measured in degrees, minutes, and seconds) into Cartesian coordinate units (e.g., a system having x and y axes). In another embodiment, the geographic position information may be expressed as a symbolic representation (e.g., Highway 44 North between exits 12 and 13) and/or converted to or from a symbolic representation.

In an exemplary normalization process, the measured cell transition and/or geographic position information may be arranged and/or have metadata added to it to facilitate further processing. First, the individual measurements may be grouped by trip (e.g., a single traversal of a specific geographic area or feature), each with a unique trip identification number. This may be done by going through the measured data sequentially. Measured data points farther apart in time than a specified interval, e.g., 15 minutes, may represent an interface between two trips. The measured data may also be associated with a particular geographic feature, e.g., a road, in the geographic area. An algorithm may be utilized to match the measured data to points on the nearest geographic feature. The algorithm may utilize digital geographic maps including location information for geographic features of interest such as roads. The digital geographic maps may be formed by correlating topographical maps with maps of the desired geographic features.

Example

FIG. 5 is a plot of CTPs corresponding to a 9.5 km section of the northbound carriageway of the A4 highway between Den Haag and Amsterdam, Netherlands. Eight CTPs are included, one for each trip along the specific section of the A4 highway. Each trip was assigned a specific five-digit trip identification number. The x-axis of FIG. 5 shows over what distance a cell signal was received. Each cell was assigned a letter. In the embodiment of FIG. 5, cells having fairly stable positions are shown, as well as some that appear erratically. The position of the F-to-G transition varies only 200 meters, while instances of the G-to-J transition may be almost 1000 meters apart. Some cell signals (e.g., A and C) are absent from some of the trips, and some trips include repeats of the same cell (e.g., F-L-F or G-J-G). The CTPs of FIG. 5 may be expresses as the patterns shown in Table 1, in which each cell is represented by a unique letter identifier.

TABLE 1

| Trip | CTP |
| --- | --- |
| 38523 | IDEFLFGJK |
| 38529 | IDEFLFGJK |
| 38530 | HIDELFLCFGJK |

TABLE 1-continued

| Trip | CTP |
|---|---|
| 38543 | IDEFLCFGJK |
| 38564 | IDELFGJK |
| 38565 | IDEFLFGJG |
| 38566 | HIDEFGJG |
| 38568 | IDADELFGJGJG |

Figure 6:
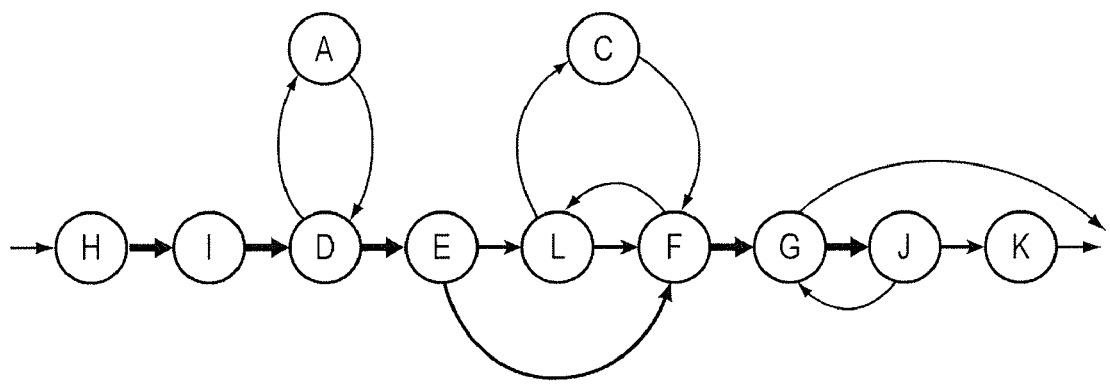
FIG. 6 is an exemplary state transition diagram that corresponds to the CTPs depicted in FIG. 5.

FIG. 6 depicts a state transition diagram corresponding to the eight CTPs of Table 1. Based on the statistical occurrence of each transition, a probability may be assigned to each transition, as shown in Table 2. The state transition diagram and the probability table may be combined into a Markov Model that may be used to differentiate between sections with similar (partial) patterns (see, e.g., J. Coleman, *Introducing Speech and Language Processing*, Cambridge University Press, Cambridge, UK (2005), the entire disclosure of which is hereby incorporated herein by reference). In an embodiment in which two different segments, e.g., road segments, have corresponding CTPs including similar or identical partial patterns, the relative frequency of the particular transitions in each pattern may be used to differentiate between the two. For example, if the transition D-A-D appears several times in the CTPs corresponding to a first segment and only once in the CTPs corresponding to a second segment, the device measuring the transition D-A-D is more likely to be in the first segment.

TABLE 2

| Transition | Probability |
|---|---|
| G => J | 0.13 |
| I => D | 0.12 |
| F => G | 0.12 |
| D => E | 0.12 |
| L => F | 0.09 |
| J => K | 0.07 |
| F => L | 0.07 |
| E => F | 0.07 |
| J => G | 0.04 |
| E => L | 0.04 |
| L => C | 0.03 |
| H => I | 0.03 |
| C => F | 0.03 |
| D => A | 0.01 |
| A => D | 0.01 |

Since most geographic features will have corresponding CTPs with a large number of transitions, in an embodiment each feature is uniquely identifiable based on the entire corresponding CTP. However, identification based on the whole CTP may be impractical, because once the whole CTP is sampled, the device may no longer be in that feature. There may also be a trade-off between sample size and location-determination speed. In a preferred embodiment, location is uniquely determinable utilizing a CTP with two transitions (i.e., from a first cell to a second cell to a third cell), but more or fewer may also be utilized.

In accordance with various embodiments of the invention, direction of travel may be determined by a CTP having only one transition (i.e., between two different cells). In an embodiment in which a particular cell may repeat in a CTP, a minimum of two transitions (i.e., from a first cell to a second cell to a third cell) may be required. In another embodiment, a minimum of three transitions (i.e., among four cells) may be utilized to uniquely identify a particular geographic feature (and a direction of travel thereon). Other embodiments of the invention may utilize CTPs of more than three transitions, depending on the specifics of the network.

As discussed above, in certain embodiments, a particular geographic feature may correlate to a CTP having three transitions (i.e., a CTP including four cell identifiers). However, in various CTPs corresponding to a specific geographic feature, a particular transition point between two cells may vary in location, e.g., by between approximately 200 and approximately 1000 meters. In an embodiment, the median of the locations of the transition point within the various CTPs is utilized as an estimate of the location of the device measuring the measured CTP.

In an exemplary experiment, the data depicted in FIG. 5, which contains eight different trips, was utilized. From the data, one trip was randomly selected for use as the test trip, and the other seven trips were utilized as the CTP map for the particular section of the A4 highway. The geographic position information (in this case measured by GPS) from the test trip was utilized for actual location and speed calculations. From the test trip, CTPs of three transitions (i.e., four-cell patterns) were matched against those in the CTP map. From the matches, estimated speed and location were calculated, and these values were compared to the known location and speed from the GPS measurements. This process was repeated until each of the eight trips functioned as the test trip.

Figure 7:
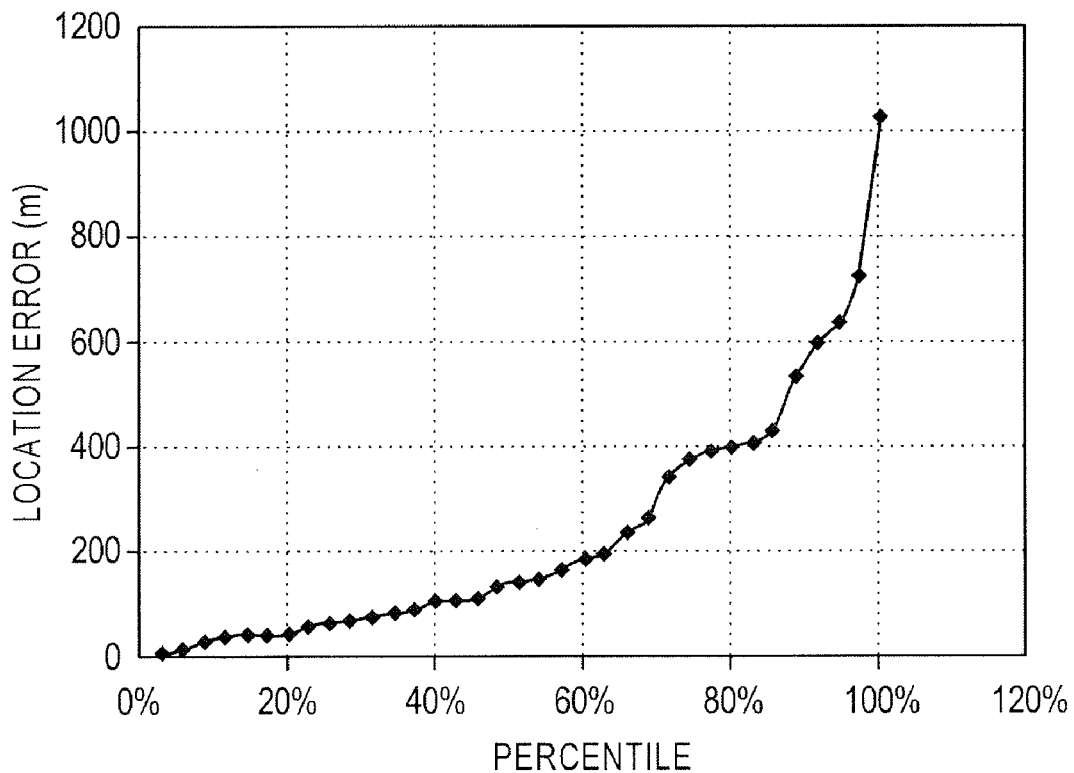
FIGS. 7 and 8 are exemplary cumulative error distribution plots for location and speed of travel based on the CTPs depicted in FIG. 5.
Figure 8:
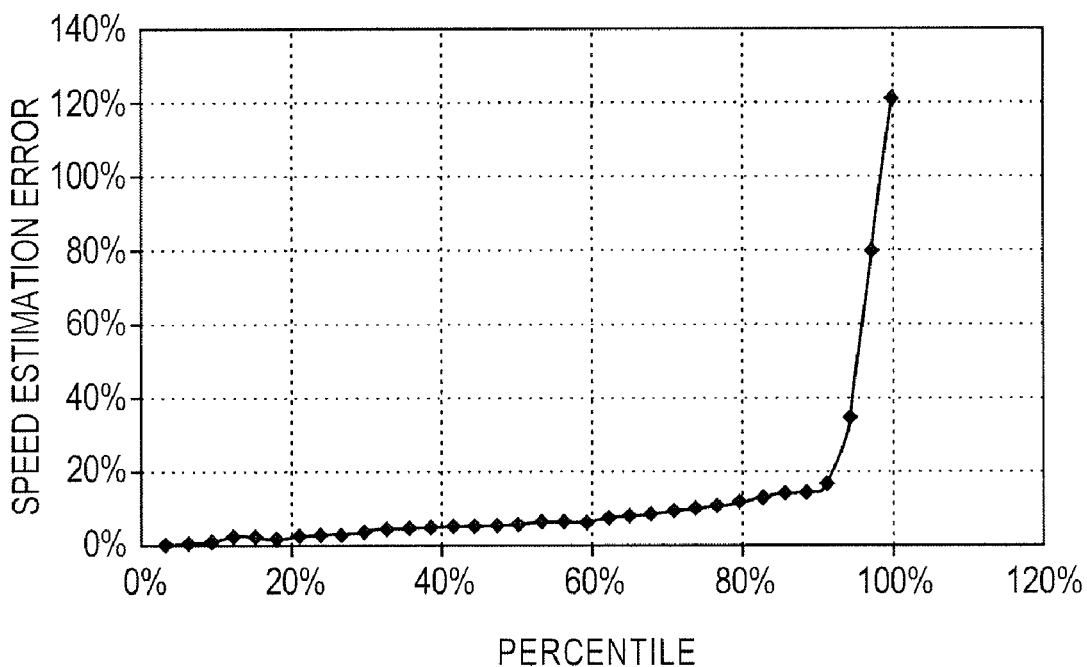

FIG. 7 depicts the cumulative distribution of the location error. 60% of all errors are below approximately 200 meters, and 95% are below approximately 650 meters (which is only approximately 50% of the average cell size). The median error is approximately 140 meters. FIG. 8 depicts the cumulative distribution of the speed estimation error as a percentage of the actual speed. The median error is approximately 6% and the maximum error is approximately 112%. The speed estimation may be accurate enough for dead reckoning between cell transitions. With an average cell size of approximately 1300 meters and an average speed of approximately 100 km/h, at 6% error, the maximum distance error is approximately 78 meters, or a mere two seconds of driving time.

Applications

Embodiments of the present invention are useful in a variety of applications. These applications include, but are not limited to the following.

Navigational aids. Embodiments of the invention may be utilized in navigational aids which calculate potential and/or preferred routes from a detected present location to a desired location.

Direction-enhanced location-based travel information. Embodiments of the invention may provide relevant travel information, e.g., traffic information, to a driver or other user. As a vehicle drives along a road, a phone (or other device) in the vehicle may collect one or more CTPs. At, for example, regular intervals, one or more measured CTPs is sent, via a wireless network, to a server. Based on the measured CTPs, the server or internal CTP map may establish the location and driving direction of the vehicle. The server may query a database for any known traffic issues, or other relevant information (e.g., speed traps), on the surrounding road(s) or other geographic features and send that information to the device. In an exemplary scenario, the location and direction information are used to determine the vehicle on which the user is traveling (e.g., a subway car, bus, or other mode of public transportation), and/or to provide information specific to that vehicle (e.g. station transfers, delays, reroutes, etc).

Standalone CTP device to enhance cellular phone functionality. Embodiments of the invention may operate (either in software or in hardware) as an application on a programmable device such as a cellular phone or a personal data assistant (PDA). Embodiments of the invention may even be resident in a vehicle itself (e.g., on a computing device comprised within a car, bus, train, etc.). However, not all devices (e.g., cellular phones) are programmable and many programmable phones may not allow access to the current cell information (e.g., cell-id) from applications on the phone. Thus, a standalone CTP-capable device may be used to measure CTPs and communicate CTP-related information (e.g., current location and direction of travel) to or via a cellular phone or other device. The standalone CTP device may be physically connected to the cellular phone (e.g., as a plug-in module or via a cable) or may communicate with it wirelessly (e.g., by Bluetooth). In an embodiment, the cellular phone detects cell information and queries a CTP map by sending CTP information from the standalone device to a central map server. The standalone CTP device may also have other functionality, such as GPS and/or ability to communicate with automated road toll systems.

Augmentation of GPS and GPS navigation systems. Under certain conditions (e.g., no line of sight, reflections, etc.), GPS performance may rapidly degrade. Areas where these conditions may exist include "urban canyons" (e.g., urban areas with many tall buildings or other reflective surfaces), tunnels (e.g., such as those employed in subway systems), and indoor areas. In these circumstances, GPS-based navigation systems may attempt to guess their position through dead reckoning and/or gyroscopes. Embodiments of the invention may be used to augment the GPS signal to provide more reliable location information. Embodiments of the invention may also determine the location of the GPS system very rapidly upon start-up, thus enabling the system to fix its position more quickly than it could otherwise. The GPS system may include CTP functionality or may communicate (e.g., by wire or wirelessly) with a CTP-capable device such as a cellular phone.

Proximity travel pattern and mode of transportation detection. The transition patterns of one or more devices may be, for example, collected in real time. Devices that have similar transition patterns may be in close proximity and/or present on the same mode of transportation. These devices may communicate with each other or with a central server in order to populate a "buddy list" (i.e., a list indicating that a known device is in proximity) or for other social networking applications.

Road toll collection. Location and direction of travel information determined via embodiments of the invention may be used for payments of tolls specific to various roads. Embodiments of the invention may also be utilized in combination with GPS-based toll systems to, e.g., verify location and/or direction of travel information (for example, to detect and combat fraud, sabotage, and or errors of the GPS-based toll system).

Tracking and tracing. Embodiments of the invention may provide a cost-effective method of tracking and tracing persons and goods, including detection of their current location.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A location determination system, comprising:
   a map comprising a plurality of transition patterns for a single geographic feature, each transition pattern being different from the other transition patterns;
   a device capable of detecting radio network identification codes for generating a measured transition pattern; and
   a computer processor that generates an approximate physical location of the device based on the measured transition pattern and the map, the computer processor implementing a matching algorithm that compensates for missing or extra cellular transitions in the measured transition pattern based on at least one of probabilities of transition patterns or deduction from previous matched transition patterns.

2. The system of claim 1, wherein the geographic feature comprises a road.

3. The system of claim 1, wherein the map is stored on the device.

4. The system of claim 1, wherein the device comprises a phone.

5. The system of claim 1, further comprising a server on which the map is stored and with which the device is capable of communicating.

6. The system of claim 1, wherein the computer processor queries the map with a wildcard pattern to determine matches for the measured transition pattern.

7. The system of claim 1, wherein the computer processor selects, from the map, a transition pattern having the smallest edit distance from the measured transition pattern.

8. The system of claim 1, wherein the computer processor selects, from the plurality of transition patterns of the map, a portion of each of which matches the measured transition pattern, a transition pattern having the highest conditional probability of matching the measured transition pattern.

9. The system of claim 1, wherein the computer processor is located on the device.

10. The system of claim 1, further comprising a server on which the computer processor is located and with which the device is capable of communicating.

11. A method for determining a location of a computing device, the method comprising:
    providing, in computer memory, a map comprising a plurality of transition patterns for a single geographic feature, each transition pattern being different from the other transition patterns;
    detecting, by a computing device, a transition pattern for the computing device; and
    querying the map, provided in the computer memory, with the detected transition pattern to determine the location of the computing device,
    wherein the detected transition pattern does not uniquely match a transition pattern of the map.

12. The method of claim 11, further comprising outputting the location on the computing device.

13. The method of claim 11, wherein the computing device comprises the map.

14. The method of claim 11, wherein providing the map comprises providing a connection between the computing device and a map server comprising the map.

15. The method of claim 11, wherein querying the map comprises matching at least a portion of the detected transition pattern with at least a portion of one of the transition patterns in the map.

16. The method of claim 11, wherein querying the map determines a direction of travel of the computing device.

17. The method of claim 16, further comprising sending the location and the direction of travel to a server.

18. The method of claim 17, further comprising receiving travel information from the server.

19. The method of claim 17, further comprising receiving toll information from the server.

20. The method of claim 17, wherein the server stores each detected location chronologically in a database.

21. The method of claim 11, further comprising sending the location of the computing device to a navigation system.

22. The method of claim 21, wherein the navigation system is a GPS-enabled system.

23. The method of claim 11, further comprising communicating with a second computing device capable of detecting radio network identification codes to generate a transition pattern.

* * * * *